(12) United States Patent
Gao et al.

(10) Patent No.: US 7,043,422 B2
(45) Date of Patent: May 9, 2006

(54) METHOD AND APPARATUS FOR DISTRIBUTION-BASED LANGUAGE MODEL ADAPTATION

(75) Inventors: Jianfeng Gao, Beijing (CN); Mingjing Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1055 days.

(21) Appl. No.: 09/945,930

(22) Filed: Sep. 4, 2001

(65) Prior Publication Data

US 2002/0188446 A1 Dec. 12, 2002

Related U.S. Application Data

(60) Provisional application No. 60/240,390, filed on Oct. 13, 2000.

(51) Int. Cl.
  *G06F 17/27* (2006.01)
(52) U.S. Cl. .................. 704/9; 704/231; 704/240; 704/250; 704/257; 704/266
(58) Field of Classification Search ............. 704/9, 704/10, 231, 240, 250, 257
  See application file for complete search history.

(56) References Cited

OTHER PUBLICATIONS

"A Language Model Adaptation Method for fixed Phrases by Emphasizing N-gram Subsets"- Tomoyoshi et al.*
1992 IEEE -"Adaptive Language Modeling Using Minimum Discriminant Estimation"—Pietra et al.*
1994 Academic Press limited-"A weighted average n-gram model of natural language"—O'Boyle et al.*
R. Iyer, M. Ostendorf, H. Gish, "Using Out-of-Domain Data to Improve In-Domain Language Models," IEEE Signal Processing letters, vol. 4, No. 8, pp. 221-223 (Aug. 1997).
P. Clarkson and A. Robinson, "Language Model Adaptation Using Mixtures and An Exponentially Decaying Cache," In Proc. ICASSP-97, pp. 799-802 (1997).
K. Seymore, R. Rosenfeld, "Large-Scale Detection and Language Model Adaptation" (Jun. 1997).
J. Gao, K.F. Lee, "Distribution-Based Pruning of Backoff Language Models," In Proceedings of the Annual Meeting of the ACL, Hong Kong, 7 pages (Oct. 3-6, 2000).

* cited by examiner

*Primary Examiner*—Richemond Dorvil
*Assistant Examiner*—Lamont Spooner
(74) *Attorney, Agent, or Firm*—Theodore M. Magee; Westman, Champlin & Kelly, P.A.

(57) ABSTRACT

A method and apparatus are provided for adapting a language model to a task-specific domain. Under the method and apparatus, the relative frequency of n-grams in a small training set (i.e. task-specific training data set) and the relative frequency of n-grams in a large training set (i.e. out-of-domain training data set) are used to weight a distribution count of n-grams in the large training set. The weighted distributions are then used to form a modified language model by identifying probabilities for n-grams from the weighted distributions.

10 Claims, 6 Drawing Sheets

METHOD AND APPARATUS FOR DISTRIBUTION-BASED LANGUAGE MODEL ADAPTATION

The present application claims priority from a Provisional Application having Ser. No. 60/240,390, filed on Oct. 13, 2000 and naming inventors Mingjing Li, Zheng Chen, Kai-Fu Lee and JianFeng Gao.

BACKGROUND OF THE INVENTION

The present invention relates to language models. In particular, the present invention relates to training language models for specific domains.

Language models provide a measure of the likelihood of a series of words appearing in a string of text. Such models are used in speech recognition, character segmentation, and pinyin-to-character conversion to identifying a most likely sequence of words given a lattice of possible sequences. For example, in speech recognition, a language model would identify the phrase "go to bed" as being more likely than the phonetically similar phrase "go too bed".

Since most current techniques of language modeling are statistically based, a language model is usually trained on text that is similar to the text that the language model will decode. If the training data and the user data are too different, the probabilities used by the language model will not accurately reflect the likelihood of the text in the user data. In particular, if the user data is focused on a specific domain and that domain is not well represented in the training data, the language model probabilities will not be reliable for most of the text in the user data. This causes the language model to give preference to a sequence of words that does not accurately match the user data.

To overcome this problem, the prior art has built task-specific language models that are trained only on data from the task-specific domain, which is always insufficient to train a reliable language model. So during decoding, the task-specific model usually works with a general language model—that is, both models provide probabilities for certain sequences of words,—and the resulting probabilities are linearly combined by applying a weight to the task-specific language model. This technique was thought to shift the probability of the general language model toward the probability provided by the task-specific language model.

To set the weights for the linear combination of probabilities, the prior art adjusted the weights to minimize perplexity, which is defined as:

$$PP = 2^{-\frac{1}{N} \sum_{i=1}^{N} \log P(w_i | w_{i-1})} \quad \text{EQ. 1}$$

where PP is the perplexity, N is the number of words in a test document, and $P(w_i|w_{i-1})$ is the probability of an n-gram (in this case the probability of the $i^{th}$ word given the word before the $i^{th}$ word, called a bigram probability). In general, the perplexity can be thought of as the geometric mean of the branching factor of the test document.

However, systems that combine the probabilities provided by a task-specific model and a general model have not provided a significant reduction in the error rate associated with task-specific data. One reason for this is that the perplexity does not correlate well with error rate when language model probabilities are linearly combined. Thus, a language model is needed that can perform well on task-specific words even when there is only a limited amount of task-specific training data available.

SUMMARY OF THE INVENTION

A method and apparatus are provided for adapting a language model to a task-specific domain. Under the method and apparatus, the relative frequency of n-grams in a small training set and the relative frequency of n-grams in a large training set are used to weight a distribution count of n-grams in the large training set. The weighted distributions are then used to form a modified language model by identifying probabilities for n-grams from the weighted distributions.

DETAILED DESCRIPTION OF ILLUSTRATIVE EMBODIMENTS

Figure 1:
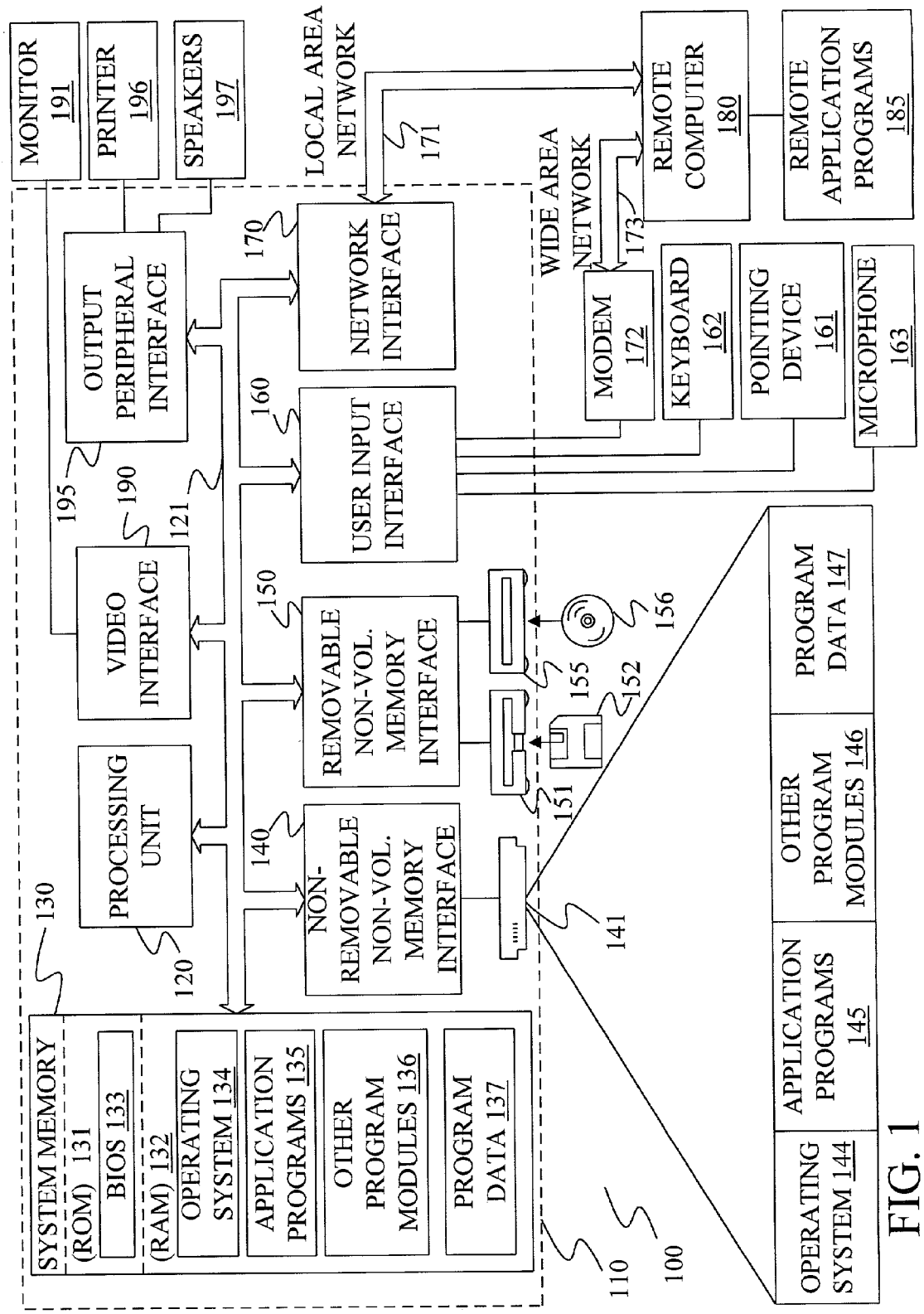
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
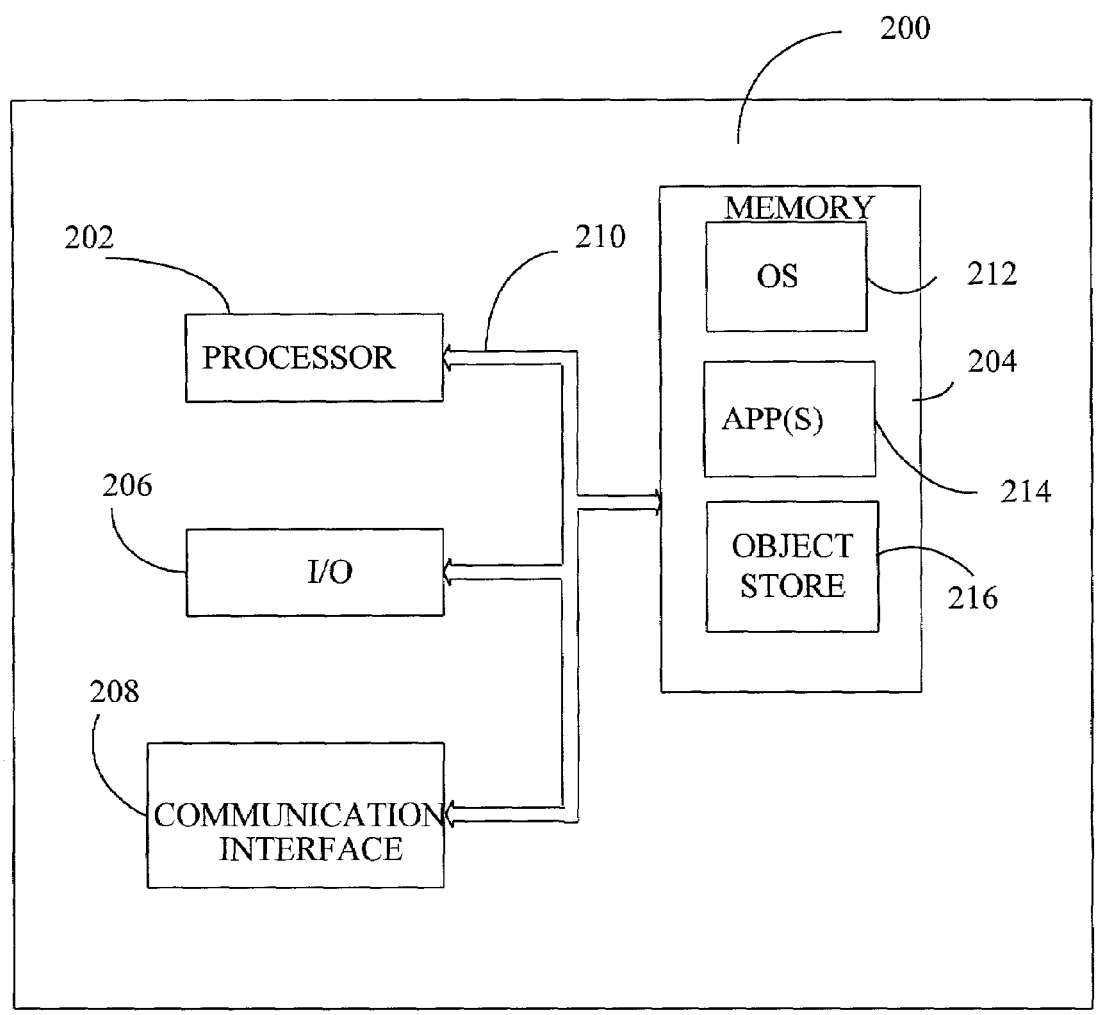
FIG. 2 is a block diagram of an alternative computing environment in which the present invention may be practiced.

FIG. 2 is a block diagram of a mobile device 200, which is an alternative exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
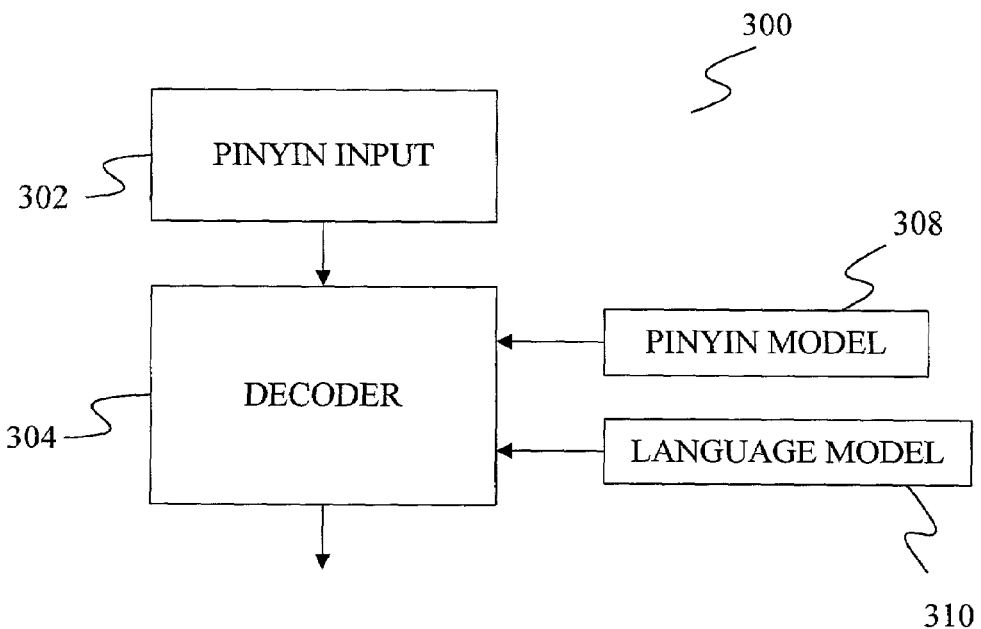
FIG. 3 is a block diagram of a pinyin-to-character conversion system in which a language model of the present invention may be utilized.

FIG. 3 provides a block diagram of a pinyin-to-character conversion system 300 that can be implemented in the environments of FIGS. 1 and 2 and that utilizes a language model of the present invention. In conversion system 300, pinyin input 302, which is the phonetic description of characters found in a character-based language such as Chinese, Japanese, or Korean, is provided to a decoder 304. Decoder 304 converts the pinyin representation into a string of characters using a pinyin model 308 and a language model 310. Pinyin model 308 provides a set of probabilities that describe the likelihood that one or more pinyin values correspond to a particular character. Language model 310 provides a set of probabilities that describe the likelihood of a sequence of characters appearing in the language of interest. Together, the two models are used to identify a sequence of characters that provides the highest combined probability for the individual characters being represented by the pinyin and the sequence of characters appearing in the language. The formation of the language model under the present invention is described further below with reference to FIGS. 5 and 6.

Figure 4:
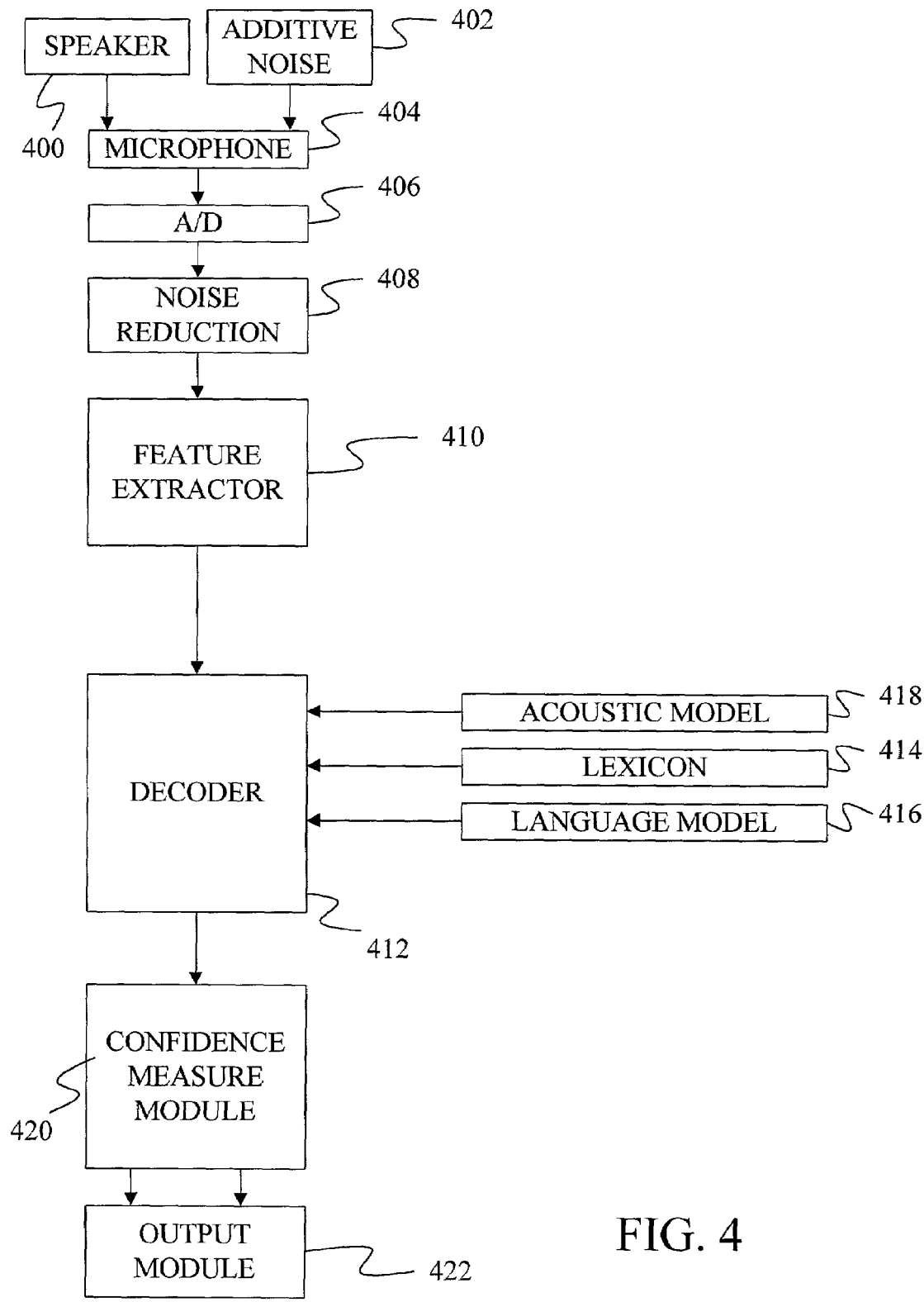
FIG. 4 is a block diagram of a pattern recognition system in which a language model of the present invention may be utilized.

FIG. 4 provides a block diagram of hardware components and program modules found in the general computing environments of FIGS. 1 and 2 that are particularly relevant to an embodiment of the present invention used for speech recognition. In FIG. 4, an input speech signal from a speaker 400 and additive noise 402 are converted into an electrical signal by a microphone 404, which is connected to an analog-to-digital (A-to-D) converter 406.

A-to-D converter 406 converts the analog signal from microphone 404 into a series of digital values. In several embodiments, A-to-D converter 406 samples the analog signal at 16 kHz and 16 bits per sample, thereby creating 32 kilobytes of speech data per second.

The digital data created by A-to-D converter 406 is provided to an optional noise reduction module 408, which removes some of the noise in the digital signal using one or more noise reduction techniques.

The output of noise reduction module 408 is provided to a feature extractor 400, which extracts a feature from the digital speech signal. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module receives the stream of digital values from noise reduction module 408 and produces a stream of feature vectors that are each associated with a frame of the speech signal. In many embodiments, the centers of the frames are separated by 10 milliseconds.

Note that although noise reduction module 408 is shown before feature extractor 400 in the embodiment of FIG. 4, in other embodiments, noise reduction module 408 appears after feature extractor 400.

The stream of feature vectors produced by the extraction module is provided to a decoder 412, which identifies a most likely sequence of words based on the stream of feature vectors, a lexicon 414, a language model 416, and an acoustic model 418.

Acoustic model 418 provides a probability that an input feature vector was created by the pronunciation of a linguistic unit such as a senone, phoneme, diphone, or triphone.

Language model 416 provides a set of likelihoods that a particular sequence of words will appear in the language of interest. Under the present invention, the language model is a statistical n-gram model that predicts the likelihood of a next word given n−1 previous words. Thus, in an embodiment that uses a trigram model, the language model predicts the likelihood of a next word given the two previous words. The formation of the language model is discussed further below in connection with FIGS. 5 and 6.

Based on the acoustic model, the language model, and the lexicon, decoder 412 identifies a most likely sequence of words from all possible word sequences. The particular method used for decoding is not important to the present invention and any of several known methods for decoding may be used.

The most probable sequence of hypothesis words is provided to a confidence measure module 420. Confidence measure module 420 identifies which words are most likely to have been improperly identified by the speech recognizer, based in part on a secondary frame-based acoustic model. Confidence measure module 420 then provides the sequence of hypothesis words to an output module 422 along with identifiers indicating which words may have been improperly identified. Those skilled in the art will recognize that confidence measure module 420 is not necessary for the practice of the present invention.

Under the present invention a task specific language model is formed by adapting general out-of-task training data based on a small set of task-specific training data. For example, under one embodiment, the out-of-task training set consists of 300 million characters collected from Chinese web sites while the task-specific data contains 40 million characters taken from specialized documents. A method for forming this language model under one embodiment of the present invention is described below using the block diagram of FIG. 5 and the flow diagram of FIG. 6.

Figure 6:
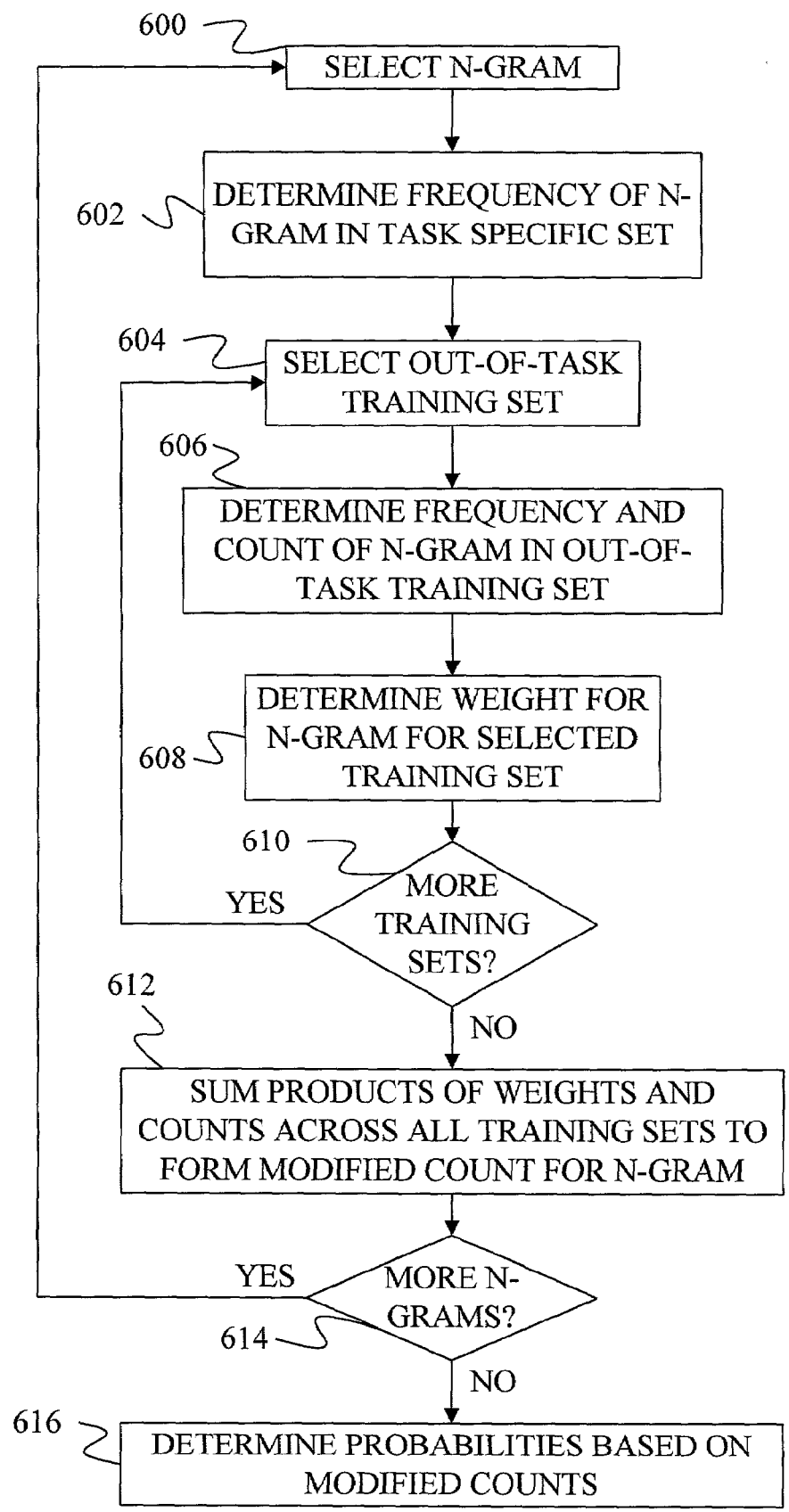
FIG. 6 is a flow diagram of a method of adapting a language model under one embodiment of the present invention.

In step 600 of FIG. 6, an n-gram is selected from a set of possible n-grams in the language. For example, in an embodiment that uses bi-grams, a pair of words would be selected in step 600. In an embodiment that uses tri-grams, a set of three words would be selected.

At step 602, a distribution adapter 506 determines the relative frequency of the selected n-gram in a set of task-specific data 504. Thus, if the n-gram selected is (dog, a), distribution adapter 506 determines the relative frequency with which "a dog" appears in the task-specific data. Under one embodiment the relative frequency is defined as:

$$p(w_1, \ldots, w_n) = \frac{C(w_1, \ldots, w_n)}{\sum_{w_1, \ldots, w_n} C(w_1, \ldots, w_n)} \quad \text{EQ. 2}$$

where $p(w_1, \ldots, w_n)$ is the relative frequency of the n-gram $w_1, \ldots, w_n$, $C(w_1, \ldots, w_n)$ is the number of times the n-gram appears in the task-specific data set, and $$\sum_{w_1, \ldots, w_n} C(w_1, \ldots, w_n)$$

is the total number of n-grams in the task-specific data set.

After the relative frequency of the n-gram in the task-specific data has been determined, a set of out-of-task training data 502 is selected at step 604. Under some embodiments, only a single set of out-of-task training data is provided. However, in other embodiments, multiple sets of out-of-task training data are available. The number of out-of-task training sets used with the present invention is a matter of design choice.

At step 606, the relative frequency of the n-gram in the selected out-of-task training set is determined using equation 2 above. Note that in determining the relative frequency of the n-gram, the count for the n-gram is also determined.

At step 608, a weight is calculated for the selected n-gram. This weight will later be used to adapt the count of the n-gram in the out-of-task training set so that it reflects the count of the n-gram in the task-specific data set 504. Under one embodiment, the weight is determined as:

$$W_i(w_1, \ldots, w_n) = \log\left(\frac{p_{specific}(w_1, \ldots, w_n)}{p_i(w_1, \ldots, w_n)}\right)^\alpha \quad \text{EQ. 3}$$

where $W_i(w_1, \ldots, w_n)$ is the weight for the selected training set for this n-gram, $p_i(w_1, \ldots, w_n)$ is the relative frequency (Equation 2) of the n-gram in the selected training set, $p_{specific}(w_1, \ldots, w_n)$ is the relative frequency (Equation 2) of the n-gram in the task specific set, and $\alpha$ is an adaptation coefficient.

Once the weight for the selected training set has been calculated, the process continues at step 610 where distribution adapter 506 determines if there are more out-of-task training sets 502. If there are more out-of-task training sets, the process returns to step 604 where the next training set is selected. Steps 606 and 608 are then repeated for the next training set.

Once a weight has been formed for all of the training sets, each weight is multiplied by the count of the n-gram in the respective out-of-task training set. The resulting products are summed together to form an adapted count for the n-gram at step 612. In terms of an equation, step 612 is defined as:

$$C(w_1, \ldots, w_n) = \sum_{i=1}^{J} W_i(w_1, \ldots, w_n) \times C_i(w_1, \ldots, w_n) \quad \text{EQ. 4}$$

where J is the total number of out-of-task training sets, $C_i(w_1, \ldots, w_n)$ is the count for the n-gram in the ith training set, $W_i(w_1, \ldots, w_n)$ is the weight for the n-gram in the ith training set, and $C(w_1, \ldots, w_n)$ is the adapted count for the n-gram.

After the adapted count has been formed for the selected n-gram, the process continues at step 614, where distribution adapter 506 determines if there are any other n-grams to be processed. If there are additional n-grams, the process returns to step 600 where the next n-gram is selected. Steps 602, 604, 606, 608, 610, and 612 are then repeated for the newly selected n-gram.

When there are no more n-grams to be processed at step 614, an adapted count has been formed for each n-gram. These adapted counts are then passed to a probability calculator 508, which determines probabilities that describe the distribution of n-grams at step 616. For example, under some embodiments, probability calculator 508 determines the probability of each n-gram by dividing the adapted count of the n-gram by the sum of the counts of n-grams that share the same set of previous words. For example, if the two tri-grams $(w_1, w_2, w_3)$ and $(w_1, w_2, w_4)$ are the only tri-grams that start with $(w_1, w_2)$ then the probability of $(w_1, w_2, w_3)$ would be calculated as:

$$p(w_1, w_2, w_3) = \frac{C(w_1, w_2, w_3)}{C(w_1, w_2, w_3) + C(w_1, w_2, w_4)} \quad \text{EQ. 5}$$

and the probability of ($w_1$, $w_2$, $w_4$) would be calculated as:

$$p(w_1, w_2, w_4) = \frac{C(w_1, w_2, w_4)}{C(w_1, w_2, w_3) + C(w_1, w_2, w_4)} \quad \text{EQ. 6}$$

Figure 5:
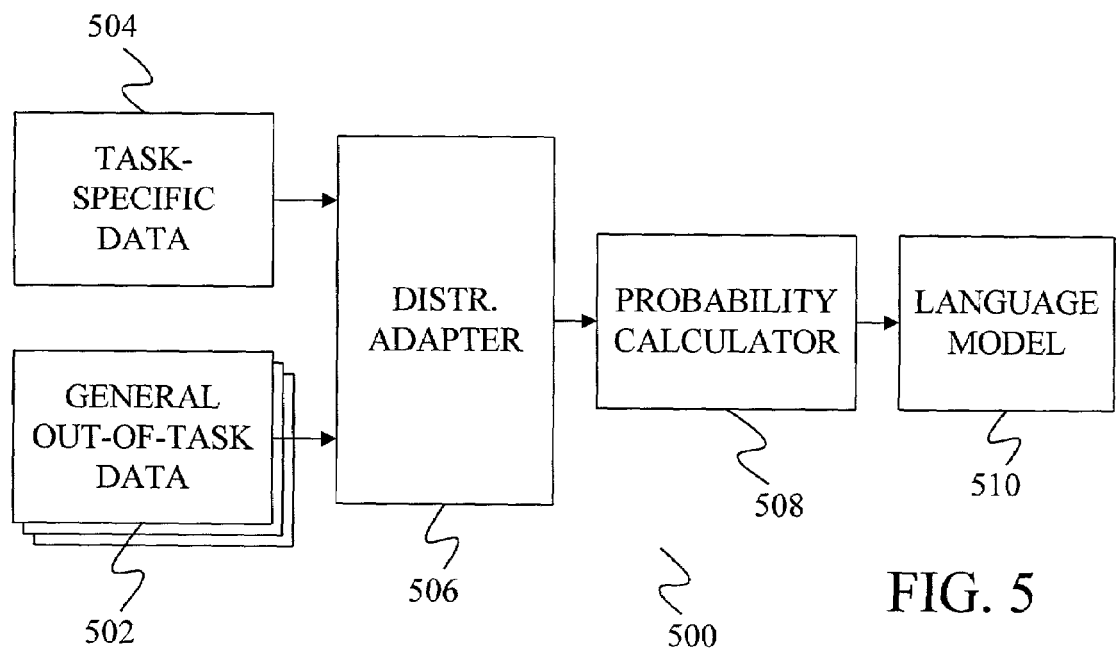
FIG. 5 is a block diagram of a training system of the present invention.

The resulting probabilities are then stored as language model 510 of FIG. 5.

To further improve the adaptation provided by the present invention, some embodiments of the present invention use a cross-validation process to select the adaptation coefficient α. This cross-validation process is described in the flow diagram of FIG. 7.

Figure 7:
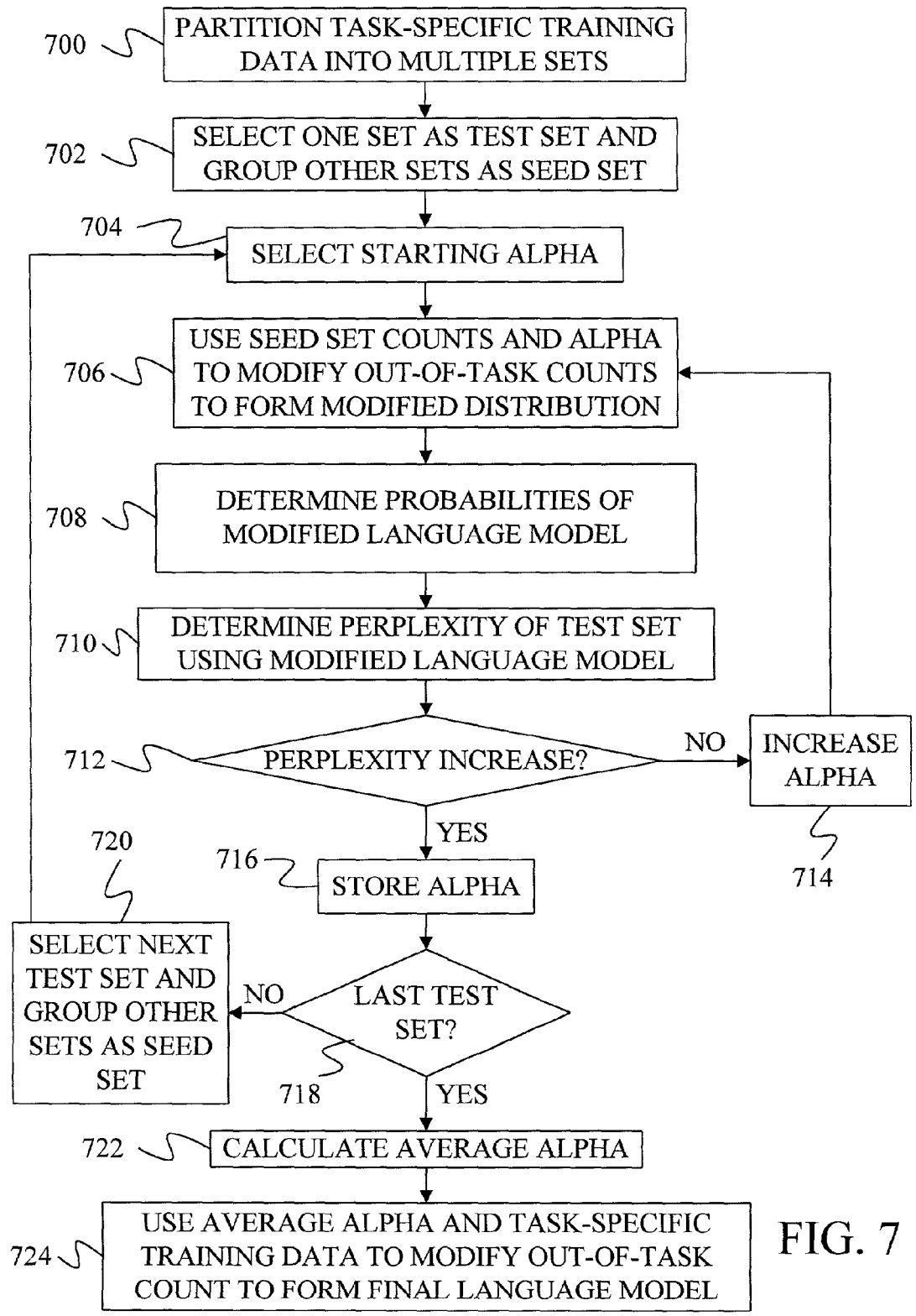
FIG. 7 is a flow diagram of a cross-validation method for selecting an adaptation coefficient under one embodiment of the present invention.

In step 700 of FIG. 7, the set of task-specific training data 504 is divided into multiple sets of training data by distribution adapter 506. At step 702, distribution adapter 506 selects one of the sets as a test set and groups the other sets to form a seed set. The seed set will be used to identify the weights for the adaptation while the test set will be used to generate a perplexity measure to estimate the effectiveness of various values of α.

At step 704, a starting value for α is selected. Under some embodiments, this starting value is 0. At step 706, the seed set and the selected α are used in the process of FIG. 6 to generate a modified count. This modified count is then used in step 708 to form a set of probabilities that form a modified language model.

At step 710, the modified language model is used to generate probabilities used in the perplexity calculation of equation 1. At step 712, this perplexity is compared to previous perplexity calculations to determine if the perplexity is increasing. During the first pass through the flow diagram of FIG. 7, the perplexity has not been calculated. As such, it is not considered to be increasing at step 712.

If the perplexity is not increasing, α is increased at step 714. The amount of increase is a matter of choice that balances accuracy in the final α with resources used in determining α. After α has been increased, the process returns to step 706, and steps 706, 708, 710, and 712 are repeated using the new α.

When the perplexity begins to increase at step 712, the previous value for α is considered to be the best α for the current test set because it provides the lowest perplexity. This value for α is thus stored at step 716.

At step 718, distribution adapter 506 determines if each of the sets formed from the task-specific data has been used as a test set. If a set has not been used as a test set, it is selected as the test set at step 720, and the remaining sets of task-specific data are grouped as a new seed set. The process of FIG. 7 then returns to step 704, where α is reset to its starting value. Steps 706, 708, 710, 712, 714, and 716 are then repeated for the new test set to identify a best value for α for the new test set.

After all of the sets of task-specific data have been used as a test set at step 718, an average value for α is calculated at step 722 by averaging the best values for α that were stored for each test set. The average value for α is then used in the process of FIG. 6, together with all of the task-specific data, to modify the count of the out-of-task data. This modified count is then used to calculate the probabilities that form the final language model at step 724.

By modifying the counts of a large out-of-task data set based on the counts provided by a small set of task-specific data, the present invention provides a significant decrease in the error rate associated with decoding task-specific user data. In particular, the present invention performs much better than prior art systems that formed language models by linearly combining the probabilities provided by a general (i.e. out-of-task) model and a task-specific model.

Although the present invention has been described with reference to particular embodiments, workers skilled in the art will recognize that changes may be made in form and detail without departing from the spirit and scope of the invention.

What is claimed is:

1. A method of forming a language model, the method comprising:
    selecting out-of-task training data having n-gram distributions;
    selecting task-specific training data having n-gram distributions;
    modifying an n-gram distribution in the out-of-task training data to form modified training data by applying a weight to an n-gram in the out-of-task training data, the weight formed as:

$$\left(\frac{P_{task\text{-}specific}}{P_{out\text{-}of\text{-}task}}\right)^\alpha$$

where $P_{task\text{-}specific}$ is the relative frequency of an n-gram in the task-specific training data, $P_{out\text{-}of\text{-}task}$ is the relative frequency of the n-gram in the out-of-task training data, and α is an adaptation coefficient; and
    identifying probabilities for the language model based on the modified training data.

2. The method of claim 1 wherein forming a weight further comprises selecting a value for the adaptation coefficient based in part on a perplexity determined for a set of test data.

3. The method of claim 2 wherein selecting a value for the adaptation coefficient comprises:
    selecting an initial value for the adaptation coefficient;
    modifying the out-of-task training data based on the initial value for the adaptation coefficient;
    identifying probabilities based on the modified training data;
    using the identified probabilities to determine the perplexity of the set of test data; and
    adjusting the adaptation coefficient based on the perplexity.

4. The method of claim 3 wherein adjusting the adaptation coefficient based on the perplexity comprises adjusting the adaptation coefficient to minimize the perplexity.

5. The method of claim 4 wherein adjusting the adaptation coefficient further comprises:
    partitioning the task-specific training data into multiple sets of data;
    identifying a separate adaptation coefficient for each set in the multiple sets of data, the adaptation coefficient being identified for a set by using the set as the test set while using the remaining sets of the task-specific training data to modify the out-of-task training data;
    averaging the separate adaptation coefficients to form an average adaptation coefficient; and
    using the average adaptation coefficient to determine the weights used to modify the out-of-task training data.

6. A tangible computer-readable medium having computer-executable instructions for forming a language model through steps comprising:

determining a distribution of entities in a small set of training data;

changing a distribution of entities in a large set of training data based on the distribution of entities in the small set of training data to form a modified distribution of entities by applying a weight to a count of entities in the large set of training data, the weight being a function of:

$$\left(\frac{P_{small\text{-}set}}{P_{large\text{-}set}}\right)^\alpha$$

where $P_{small\text{-}set}$ is a relative frequency of an entity in the small set of training data, $P_{large\text{-}set}$ is a relative frequency of the entity in the large set of training data, and $\alpha$ is an adaptation coefficient; and using the modified distribution of entities to identify probabilities for the language model.

7. The computer-readable medium of claim 6 wherein the entities comprise n-grams.

8. The computer-readable medium of claim 6 wherein applying a weight further comprises selecting the adaptation coefficient to minimize perplexity measured against a set of test data.

9. The computer-readable medium of claim 8 wherein applying a weight further comprises determining a separate adaptation coefficient for each of a plurality of sets of test data and determining an average adaptation coefficient from the separate adaptation coefficients.

10. The computer-readable medium of claim 9 wherein determining a separate adaptation coefficient comprises:

selecting one set of test data from the plurality of sets of test data;

grouping the remaining sets of test data as the small set of training data;

determining the adaptation coefficient to minimize the perplexity against the selected set of test data.

\* \* \* \* \*

UNITED STATES PATENT AND TRADEMARK OFFICE
CERTIFICATE OF CORRECTION

PATENT NO. : 7,043,422 B2
APPLICATION NO. : 09/945930
DATED : May 9, 2006
INVENTOR(S) : Jianfeng Gao et al.

It is certified that error appears in the above-identified patent and that said Letters Patent is hereby corrected as shown below:

In column 9, line 57, delete "a" and insert -- α --, therefor.

Signed and Sealed this

Twentieth Day of July, 2010

David J. Kappos
*Director of the United States Patent and Trademark Office*